(12) United States Patent
Zhang et al.

(10) Patent No.: US 9,909,195 B2
(45) Date of Patent: Mar. 6, 2018

(54) METHOD AND APPARATUS FOR INJECTING WATER RESTRAINT LAYER OF LASER SHOCK PROCESSING BLADE

(71) Applicants: BEIJING AERONAUTICAL MANUFACTURING TECHNOLOGY RESEARCH INSTITUTE, Beijing (CN); SOUTHEAST UNIVERSITY, Jiangsu (CN); JIANGSU UNIVERSITY, Jiangsu (CN)

(72) Inventors: Yongkang Zhang, Jiangsu (CN); Jinzhong Lu, Jiangsu (CN); Shuili Gong, Beijing (CN); Fengze Dai, Jiangsu (CN); Shikun Zou, Beijing (CN)

(73) Assignees: BEIJING AERONAUTICAL MANUFACTURING TECHNOLOGY RESEARCH INSTITUTE (CN); SOUTHEAST UNIVERSITY (CN); JIANGSU UNIVERSITY (CN)

( * ) Notice: Subject to any disclaimer, the term of this patent is extended or adjusted under 35 U.S.C. 154(b) by 311 days.

(21) Appl. No.: 14/765,538

(22) PCT Filed: May 21, 2013

(86) PCT No.: PCT/CN2013/075954
§ 371 (c)(1),
(2) Date: Aug. 3, 2015

(87) PCT Pub. No.: WO2014/117457
PCT Pub. Date: Aug. 7, 2014

(65) Prior Publication Data
US 2015/0368744 A1 Dec. 24, 2015

(30) Foreign Application Priority Data

Feb. 4, 2013 (CN) .......................... 2013 1 0040843

(51) Int. Cl.
B23K 26/00 (2014.01)
C21D 10/00 (2006.01)
(Continued)

(52) U.S. Cl.
CPC .......... C21D 10/005 (2013.01); B05B 12/122 (2013.01); B23K 26/146 (2015.10);
(Continued)

(58) Field of Classification Search
CPC ................ C21D 10/005; B23K 26/146; B23K 26/1462; B23K 26/356; B23K 26/1464; B23K 2201/001; B05B 12/122
(Continued)

(56) References Cited

U.S. PATENT DOCUMENTS 4,401,477 A * 8/1983 Clauer ............... B23K 26/0069
148/525
4,498,917 A * 2/1985 Weinstein ............. C03C 25/104
134/1
(Continued)

FOREIGN PATENT DOCUMENTS

| CN | 100335227 | 9/2007 | ............. B23K 26/14 |
| CN | 100409994 | 8/2008 | ............. B23K 26/18 |
| CN | 101474723 | 7/2009 | ............. B23K 26/18 |

OTHER PUBLICATIONS

International Search Report issued in corresponding application No. PCT/CN2013/075954, dated Nov. 7, 2013 (8 pgs).

*Primary Examiner* — Viet Le
(74) *Attorney, Agent, or Firm* — Hayes Soloway P.C.

(57) ABSTRACT

A method and apparatus are provided for springing a homogeneous water confinement layer on the surface of a work
(Continued)

piece during a laser shock peening process. The method and apparatus are particularly for suitable for forming a homogeneous water layer on a low curvature surface such as found on turbine blades.

2 Claims, 3 Drawing Sheets

(51) Int. Cl.
*C21D 11/00* (2006.01)
*B23K 26/146* (2014.01)
*B23K 26/14* (2014.01)
*B05B 12/12* (2006.01)
*B23K 26/356* (2014.01)
*B23K 101/00* (2006.01)

(52) U.S. Cl.
CPC ...... *B23K 26/1462* (2015.10); *B23K 26/1464* (2013.01); *B23K 26/356* (2015.10); *C21D 11/005* (2013.01); *B23K 2201/001* (2013.01)

(58) Field of Classification Search
USPC ............................... 219/128, 121.61, 121.82
See application file for complete search history.

(56) References Cited

U.S. PATENT DOCUMENTS

| | | | | | |
|---|---|---|---|---|---|
| 4,982,065 | A * | 1/1991 | Sandaiji | ............... | C23F 1/02 216/22 |
| 5,131,957 | A * | 7/1992 | Epstein | ............... | B23K 26/0069 148/513 |
| 5,151,134 | A * | 9/1992 | Boquillon | ............... | B08B 7/0042 134/1 |
| 5,591,009 | A * | 1/1997 | Mannava | ............... | C21D 10/005 148/525 |
| 5,741,559 | A * | 4/1998 | Dulaney | ............... | B05D 3/06 118/695 |
| 5,742,028 | A * | 4/1998 | Mannava | ............... | B23K 26/0069 219/121.82 |
| 5,744,781 | A * | 4/1998 | Yeaton | ............... | B23K 26/0075 219/121.84 |
| 5,767,479 | A * | 6/1998 | Kanaoka | ............... | B23K 26/40 219/121.61 |
| 5,859,405 | A * | 1/1999 | Golz | ............... | B23P 25/006 148/565 |
| 5,952,014 | A * | 9/1999 | Wada | ............... | G11B 5/8404 219/121.65 |
| 6,281,473 | B1 | 8/2001 | Wright, III et al. | ..... | 219/121.84 |
| 6,359,257 | B1 * | 3/2002 | Clauer | ............... | B23K 26/16 219/121.6 |
| 6,852,179 | B1 * | 2/2005 | Toller | ............... | C21D 10/005 148/525 |
| 7,204,677 | B2 * | 4/2007 | Mannava | ............... | C21D 10/005 416/241 R |
| 7,217,102 | B2 * | 5/2007 | Rockstroh | ............... | B24C 1/10 29/889.2 |
| 7,470,335 | B2 * | 12/2008 | Toller | ............... | C21D 10/005 148/525 |
| 8,222,567 | B2 * | 7/2012 | Mathai | ............... | G01N 29/045 219/121.6 |
| 9,085,050 | B1 * | 7/2015 | Zediker | ............... | B23K 26/146 |
| 9,130,030 | B1 * | 9/2015 | Park | ............... | H01L 21/78 |
| 9,803,258 | B2 * | 10/2017 | Murphy | ............... | F01D 5/286 |
| 2004/0040944 | A1 * | 3/2004 | Offer | ............... | B23K 9/0026 219/128 |
| 2004/0228376 | A1 * | 11/2004 | Dane | ............... | C21D 10/005 372/32 |
| 2006/0054607 | A1 * | 3/2006 | Wu | ............... | B23K 26/0069 219/121.83 |
| 2006/0061854 | A1 * | 3/2006 | Dane | ............... | B23K 26/0069 359/333 |
| 2006/0065333 | A1 * | 3/2006 | Hackel | ............... | C21D 1/09 148/565 |
| 2007/0262063 | A1 * | 11/2007 | Sano | ............... | B23K 26/0066 219/121.85 |
| 2008/0067159 | A1 * | 3/2008 | Zhang | ............... | B23K 26/16 219/121.84 |
| 2008/0105666 | A1 * | 5/2008 | Adachi | ............... | B23K 26/0069 219/121.82 |
| 2009/0084767 | A1 * | 4/2009 | Deaton, Jr. | ........ | B23K 26/0069 219/121.83 |
| 2009/0120914 | A1 * | 5/2009 | Lawrence | ............ | C21D 10/005 219/121.61 |
| 2009/0135985 | A1 * | 5/2009 | Ono | ............... | B23K 26/03 376/260 |
| 2009/0158797 | A1 * | 6/2009 | Lahrman | ............ | B23K 26/0069 72/53 |
| 2009/0230104 | A1 * | 9/2009 | Domec | ............... | B23K 9/0282 219/121.78 |
| 2011/0163078 | A1 * | 7/2011 | Fukushima | .......... | B23K 26/146 219/121.71 |
| 2011/0223443 | A1 * | 9/2011 | Scheel | ............... | B23P 9/02 428/687 |
| 2011/0253690 | A1 * | 10/2011 | Dane | ............... | G02B 27/0927 219/121.74 |
| 2012/0031147 | A1 * | 2/2012 | Arai | ............... | B23K 26/0057 65/182.2 |
| 2013/0101761 | A1 * | 4/2013 | Bunker | ............... | F01D 5/288 428/34.1 |
| 2014/0041224 | A1 * | 2/2014 | Murphy | ............... | F01D 5/286 29/889.7 |
| 2015/0041025 | A1 * | 2/2015 | Wescott | ............... | B23K 9/042 148/538 |
| 2015/0181685 | A1 * | 6/2015 | Sekhar | ............... | H01J 37/3233 427/569 |
| 2015/0183070 | A1 * | 7/2015 | Jones | ............... | B23P 23/04 219/76.14 |
| 2015/0185109 | A1 * | 7/2015 | Duesler | ............... | B23K 26/0069 73/12.01 |
| 2015/0196972 | A1 * | 7/2015 | Wohl, Jr. | ........... | B23K 26/0081 428/687 |
| 2015/0209901 | A1 * | 7/2015 | Hu | ............... | B23K 26/032 219/121.83 |
| 2015/0209911 | A1 * | 7/2015 | Yamada | ............... | B23K 26/38 219/121.67 |
| 2015/0233257 | A1 * | 8/2015 | Fujiya | ............... | F01D 5/288 416/224 |
| 2015/0336219 | A1 * | 11/2015 | Bruck | ............... | B23K 9/042 427/142 |
| 2015/0368744 | A1 * | 12/2015 | Zhang | ............... | C21D 10/005 239/1 |
| 2015/0375338 | A1 * | 12/2015 | Valiente | ............... | B23K 26/361 219/121.61 |
| 2015/0377043 | A1 * | 12/2015 | Haraguchi | ............ | B23K 26/38 415/208.1 |
| 2016/0023306 | A1 * | 1/2016 | Arjakine | ............... | B23K 26/1476 219/76.1 |
| 2016/0067827 | A1 * | 3/2016 | Zediker | ............... | B23K 26/342 219/76.12 |
| 2016/0068278 | A1 * | 3/2016 | Furfari | ............... | B64F 5/0009 244/119 |
| 2016/0083815 | A1 * | 3/2016 | Glaser | ............... | B23K 26/0069 72/56 |
| 2016/0138127 | A1 * | 5/2016 | Nomura | ............ | B23K 26/0622 72/56 |
| 2016/0199943 | A1 * | 7/2016 | Hu | ............... | B23K 26/16 219/121.71 |
| 2016/0199945 | A1 * | 7/2016 | McDowell | .......... | B23K 26/389 219/121.71 |
| 2016/0288258 | A1 * | 10/2016 | Nomura | ............ | B23K 26/0069 |
| 2016/0288260 | A1 * | 10/2016 | Kobayashi | .......... | B23K 26/211 |
| 2016/0326880 | A1 * | 11/2016 | Slavens | ............... | B22F 5/04 |
| 2016/0333433 | A1 * | 11/2016 | Petrosky | ............... | C21D 1/09 |
| 2016/0355902 | A1 * | 12/2016 | Yang | ............... | B23K 26/32 |
| 2016/0368091 | A1 * | 12/2016 | Takahashi | .......... | B23K 26/1476 |
| 2017/0022584 | A1 * | 1/2017 | Dom Nguez | ......... | C21D 9/30 |
| 2017/0050265 | A1 * | 2/2017 | Lu | ............... | C21D 1/09 |

(56) References Cited

U.S. PATENT DOCUMENTS

| | | | |
|---|---|---|---|
| 2017/0072509 A1* | 3/2017 | Okuda | B23K 26/03 |
| 2017/0072510 A1* | 3/2017 | Peters | B23K 26/1462 |
| 2017/0087670 A1* | 3/2017 | Kalentics | B33Y 10/00 |
| 2017/0100798 A1* | 4/2017 | Nagata | B23K 26/146 |
| 2017/0120384 A1* | 5/2017 | Okuda | B23K 26/147 |
| 2017/0157709 A1* | 6/2017 | Richerzhagen | B23K 26/146 |
| 2017/0173747 A1* | 6/2017 | Jones | B23P 23/04 |
| 2017/0182593 A1* | 6/2017 | Richerzhagen | B23K 26/146 |
| 2017/0203385 A1* | 7/2017 | Ren | B23K 26/0066 |

* cited by examiner

METHOD AND APPARATUS FOR INJECTING WATER RESTRAINT LAYER OF LASER SHOCK PROCESSING BLADE

BACKGROUND OF INVENTION

1. Field of the Invention

The presented invention relates to a method and an apparatus to spray water confinement layer on the surface of workpiece during laser shock peening process, and forms a homogeneous water layer on the peening region. This method is suitable to form water layer on low curvature surface (curvature radius<50).

2. Background Art

Laser shock peening (LSP) is an advanced surface strengthening technology. With high power, high pressure, super speed and super strain rate, LSP technology has unmatched advantage over conventional methods. It can greatly improve the durability of metal, prevent the initiation of cracks, extend the life expectancy of workpieces and reduce the cost of maintenance. Since the beginning of the 21st century, USA has applied LSP technology to strengthen or repair turbine blades in fighter F101, F119 and F414.

In order to achieve the strengthen effect of LSP; a confinement layer should be applied on the peening surface. The thickness, material (Component and property) of the confinement layer directly affects the peening effect. Up to now, materials reported in literatures are: K9 glass, organic glass, silica gel, synthetic resin and water, etc. The glass like confinement layer has a great effect on upgrading shock power, but are only suitable on the flat surface. And it also has disadvantages such as frangibility and hard to clean. Silica gel and synthetic resin have a poor binding force with the target surface, and can hardly be reused. The advantages of the water confinement layer are: cheap, clean, recycle and can easily be applied to curved surface; the flowing water can also remove the solid particles produced by plasma Explosion. In LSP industry, water is the most commonly used material for confinement layer.

The typical industrial application of LSP is the laser shock peening process of the turbine blisk. For blades having curved surface, during the process, a programmable multi-axis workbench is used to adjust the motion and rotation of the blisk, to keep the laser beam perpendicular to the tangent plane of the peening point. Currently, the existing water confinement applying apparatus has a fixed water tap; the angle and the position of the water jet cannot be adjusted. During the peening process, if the water flow velocity is too big, a gap may form between the water layer and the concave surface of the blade. This phenomenon should be evaded, for laser will directly ablate the blade surface and cause undesired damage. If the water layer is too thick, it will negatively affect the LSP process. In order to achieve a perfect strengthen effect, only controlling the motion and position of the blisk is not enough, the direction of the water jet should also be optimized during the peening process.

CONTENTS OF INVENTION

The presented invention has been made in order to solve the above problems in the prior part. A method and an apparatus solve these problems.

A method to spray water confinement layer: in the plane of incident laser beam, take three points (probe point I, probe point II and peening point) from the blade surface; Then build a theoretical curve trough the coordinates of this points; Take this curve as the outline of the blade, adjust the position of the tap and make the angle between water jet and the tangent plane of peening point 10°-15°; let the water flow from the midpoint of theoretical curve into the work plane, so a stable and homogeneous water confinement layer can be formed in the peening region.

An apparatus for spray water confinement layer comprising: diastimeter platform 2, holder 14, diastimeter 3, controller I 5, controller II 8, tap 4, Transition joint 7, signal line I 10, signal line II 11, signal line III 28, signal line IV 29, flexible pipe 12, and water tank 6; Two detection heads (detection head I 16 and detection head II 17) are installed on the diastimeter 3, the distance between them is adjustable (10-20 mm). The vector from detection head I 16 to detection head II 17 is perpendicular to the bottom plane of diastimeter 3. The output end of the diastimeter 3 is connected to the input end of the controller I 5. The controller I 5 is the general control, it controls the motion of five-axis table 9, controller II 8 and tap 4; The signal line III 5 connect the input end of the five-axis table 9 and the output end of the controller I 5; diastimeter platform 2 is located between the laser device 1 and the five-axis table 9; diastimeter 3 is fixed on the diastimeter platform 2 through the holder so the laser beam can get through the gap between the diastimeter 3 and diastimeter platform 2 without interference; signal line I 10 connected the output end of diastimeter 3 with the input end of controller I 5; to prevent the interference with laser beam 15, the controller I 5 is located beyond the five-axis table 9 and its output end is connected with the input end of tap 4; controller II 8 is fitted on the transition joint 7, signal line IV 29 connected the input end of controller II 8 with the output end of the controller I 5; tap 4 is located beyond the five-axis table 9 which is 10-20 mm higher than the detection head I 16, the tap 4 is connected with flexible pipe 12 through the transition joint 7; the water tank 6 is located beyond tap 4 and joint with transition joint 7.

The tap 4 contains a outer casing 26 and a flat nozzle, the sectional dimension of the nozzle is 1 mm×20 mm, and it can rotate around the axis of the outer casing 26; there are taper pipe threads at the two ends of the transition joint 7 and tap 4 and flexible pipe 12 is connected to the different end of the transition joint 7. Controller II 8 is set between the flexible pipe 12 and the outer casing 26 of tap 4, which is used to control the rotation of nozzle and the flux, pressure, velocity of the water jet. The flexible pipe 12 is consisted by 15-30 small taper pipes, the angle between two adjacent taper pipe axes is below 30°, so the flexible pipe 12 can be set as any angle and position. The controller II 8 is controlled by the controller I 5, it can adjust the position of tap 4 and the rotation of nozzle 27 due to different working condition. Before LSP according to the feed back information from the diastimeter 3, the controller I adjusts the position of nozzle 27 and makes its long side parallel to the tangent plane of the peening point 22 on the blade 13, and adjusts the angle between water jet and the tangent plane of peening point to 10°-15°, makes sure that a uniform water confinement layer can be formed in the peening region.

The specific steps for using this apparatus:

(1) Use holder 14 to fix diastimeter 3 on the diastimeter platform 2, make sure that the vector between detection head I 16 and detection head II 17 is perpendicular to the datum plane 23, and parallel to the laser beam 15; while the vertical distance between detection head II 17 and peening point 22 is 10-20 mm, the horizontal distance between detection head II 17 and peening point 22 is 20-30 mm; adjust the position of detection head I 16 to make the vertical distance to the peening point 22 is D2 (D2=D1×2).

(2) Clamp the blade 13 on the five-axis table 9, control the motion of the five-axis table 9 make the peening point is on the focal point of laser beam 15 and make sure that the tangent plane of peening point 22 is coincide with the work plane 25.

(3) Get two points, whose vertical distance from the peening point 22 is D2 and D1 respectively, and measure their distance from the work plane 25 (L1 and L2), then input L1, L2, D1, D2 to the controller I 5; through the program in the controller I 5, take the incident laser beam 15 as horizontal axis, the vertical direction as vertical axis, and peening point 22 as original point build a coordinate system, then input coordinates (L1, D1) and (L2, D2); according to the input coordinates, the controller I 5 works out the rotation angle and the displacement of tap 4. For tan $\theta$=D2/L2, where $\theta$ is the angle between water jet and the tangent plane of peening point; the abscissa of the water jet spraying point is (L2−2L1)/2*Cos($\theta$)*Cos($\theta$)+L1 and the ordinate of the water jet spraying point is (L2−2L1)/2*Cos($\theta$)*Sin($\theta$)+D1. According to these data the controller I 5 can control the motion or rotation of the tap 4, and through controller II 8 adjust the rotation of nozzle 27 make its long side parallel to the tangent plane of the peening point 22 on the blade 13, and the angle between water jet and the tangent plane of peening point between 10°-15°, to form a homogeneous water confinement layer.

(4) Through controller II 8, controller I 5 adjusts the flux and speed of the water jet. Adjust the thickness of water confinement layer on the peening region between 1-3 mm to guarantee the stability of water confinement layer and keep it contact with the blade surface.

Positive Effects:

(1) Enhance the LSP quality and effect. The tap can adjust its position due to different spatial location of the blade to form a stable and homogeneous water confinement layer.

(2) Simplified the complex information of the blade surface, easy for Programming and automation. The real surface in the laser incident plane is simplified to micro theoretical curve, which is figured out by take three points from the blade surface.

(3) The water jet enters the surface from the mid-point of the theoretical curve. This method prevents the formation of turbulent flow at the peening point.

(4) The design of the flat nozzle can easily adjust parallel to the tangent plane of the peening point, and from a homogeneous water confinement layer; mean while keep the angle between water jet and the tangent plane of peening point between 10°-15° can improve stability of LSP, prevent the formation of gap between the water confinement layer and blade surface, or local block in the concave surface of the blade.

(5) The controller II, which is set between the flexible pipe and the outer casing of tap, can directly control the flux, pressure, and velocity of the water jet nd the rotation of the nozzle.

(6) The Transition joint can strengthen the joint strength between the flexible and tap, and act as a buffer when water flow change from roundness to rectangle, make the apparatus can bear higher water pressure.

DETAILED DESCRIPTION OF THE INVENTION

Figure 1:
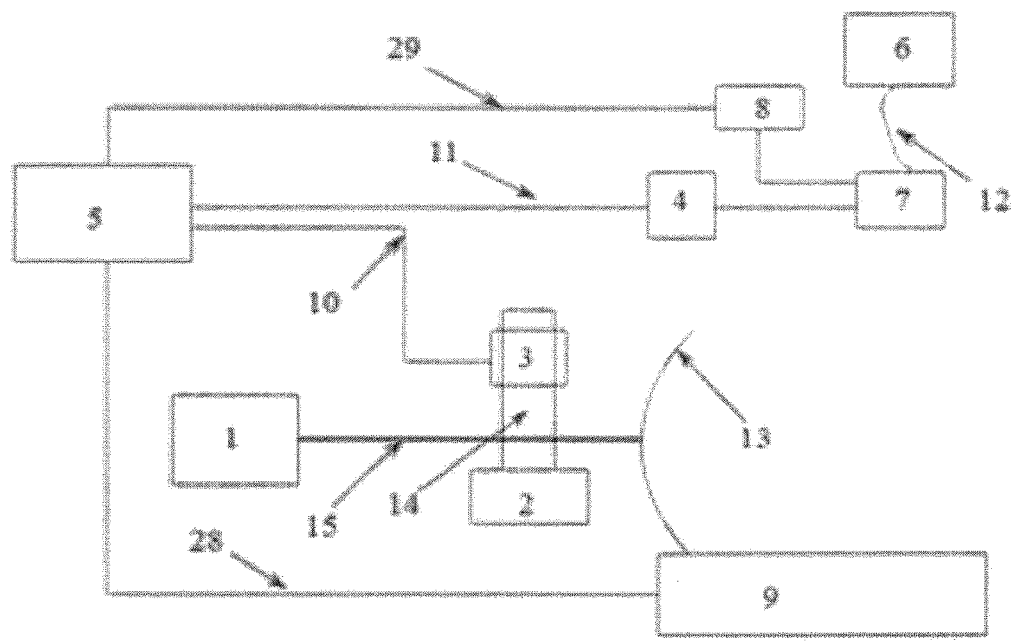
FIG. 1 is the schematic diagram of the water confinement layer spraying apparatus.
Figure 2:
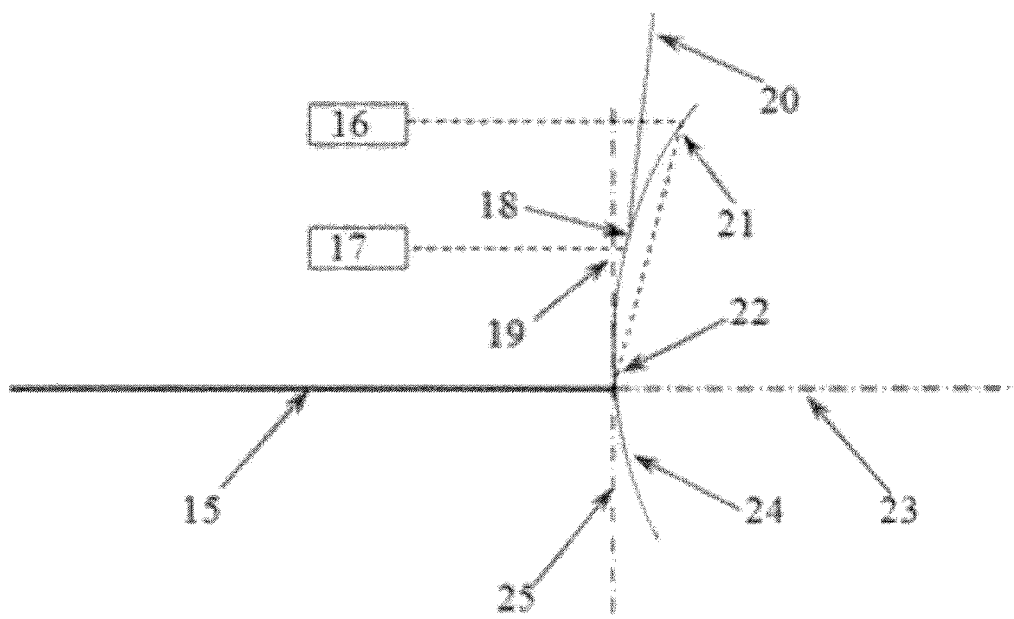
FIG. 2 is the schematic diagram of how water jet is sprayed.
Figure 3:
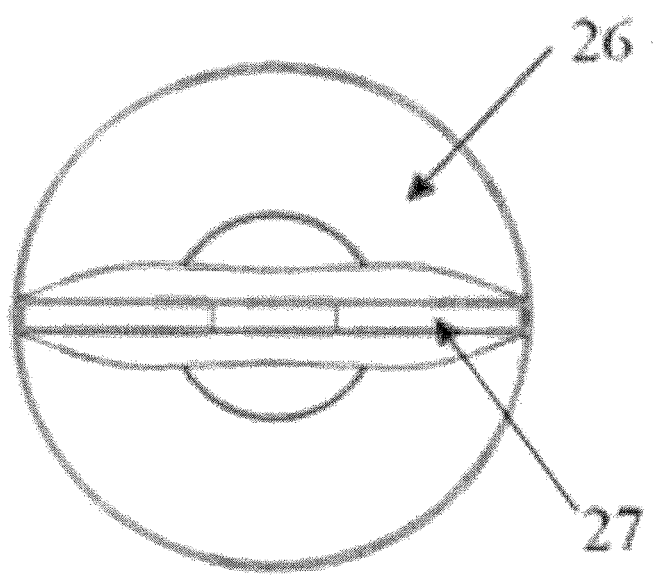
FIG. 3 is the tap chart.
Figure 4:
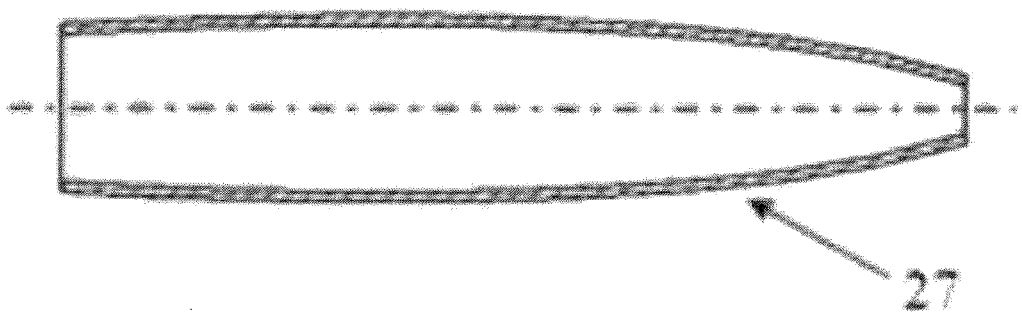
FIG. 4 is the nozzle chart.
Figure 5:
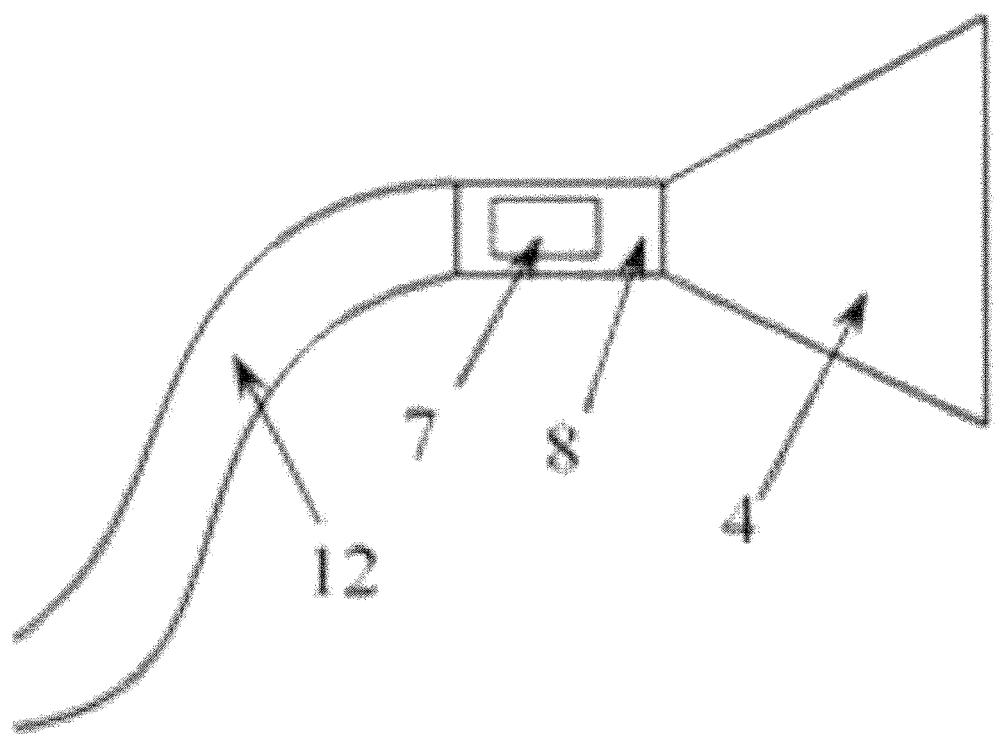
FIG. 5 is the connection of tap, Transition joint, controller II and flexible pipe.

FIG. 1 is the Schematic diagram of the apparatus. It contains diastimeter platform 2, holder 14, diastimeter 3, controller I 5, controller II 8, tap 4, Transition joint 7, signal line I 10, signal line II 11, signal line III 28, signal line IV 29, flexible pipe 12, and water tank 6. The signal line III 5 connects the input end of the five-axis table 9 and the output end of the controller I 5; diastimeter platform 2 is located between the laser device 1 and the five-axis table 9; diastimeter 3 is mounted on the diastimeter platform 2 through the holder (the laser beam can get through the gap between the diastimeter 3 and diastimeter platform 2 with on interference); signal line I 10 connects the output end of diastimeter 3 with the input end of controller I 5; to prevent the interference with laser beam 15, the controller I 5 is located beyond the five-axis table 9 and it's output end is connected with the input end of tap 4; controller II 8 is fitted on the transition joint 7, signal line IV 29 connected the input end of controller II 8 with the output end of the controller I 5; tap 4 is located beyond the beyond the five-axis table 9 which is 10-20 mm higher than the detection head I16, the tap 4 is connected with flexible pipe 12 through the Transition joint 7; the water tank 6 is located beyond tap 4 and joint with Transition joint 7.

EMBODIMENTS (1) Use holder 14 to fix diastimeter 3 on the diastimeter platform 2, make sure that the vector between detection head I 16 and detection head II 17 is perpendicular to the datum plane 23, and parallel to the laser beam 15; while the vertical distance between detection head II 17 and peening point 22 is 10-20 mm, the horizontal distance between detection head II 17 and peening point 22 is 20-30 mm; adjust the position of detection head I16 to make the vertical distance to the peening point 22 is D2 (D2=D1×2).

(2) Clamp the blade 13 on the five-axis table 9, control the motion of the five-axis table 9 to make sure the peening point is on the local point of laser beam 15 and make sure that the tangent plane of peening point 22 coincides with the work plane 25.

(3) Get two points, which their vertical distance form the peening point 22 is D2 and D1 respectively, and measure their distance to the work plane 25(L1 and L2), then input L1, L2 to the controller I 5; through the program in the controller I 5, take the incident laser beam 15 as a horizontal axis, the vertical direction as a vertical axis, and peening point 22 as an original point to build a coordinate system, then input coordinates (L1, D1) and (L2, D2); according to the input coordinates, the controller I 5 works out the rotation angle and the displacement of tap 4, so it can control the motion or rotation of the tap 4, while the controller II 8 controls the rotation of nozzle 27, makes the long side of the nozzle 27 is parallel to the tangent plane of the peening point 22 on the blade 13, the angle between water jet and the tangent plane of peening point is 10°-15°;

(4) Through controller II 8, controller I 5 adjusts the flux and the speed of the water jet, keeps the thickness of water confinement layer on the peening region is 1-3 mm, and guarantees the stability of water confinement layer and keeps it contacting with the blade surface.

What is claimed is:

1. A water confinement layer spraying apparatus comprising: a diastimeter platform, a holder, a diastimeter, a first controller, a second controller, a tap, a transition joint, a first signal line, a second signal line, a third signal line, a fourth signal line, a flexible pipe, and a water tank; a first detection head and a second detection head installed on the diastimeter; a distance between the first detection head and the second detection head being adjustable; an output end of the diastimeter being connected to an input end of the first controller; the first controller being the general control for controlling the motion of a five-axis table, second controller and the tap; the third signal line connecting an input end of the five-axis table and an output end of the first controller; the diastimeter platform being located between the laser device and the five-axis table; the diastimeter being fixed on the diastimeter platform through the holder a gap located between the diastimeter and diastimeter platform, the diastimeter being fixed on the diastimeter platform through the holder so the laser beam can get through the gap without interference; the first signal line being connected to the output end of the diastimeter with the input end of the first controller; the first controller being located beyond the five-axis table and its output end being connected with the input end of tap; the second controller being fitted on the transition joint, the fourth signal line being connected the input end of the second controller with the output end of the first controller; the tap being located beyond the five-axis table which is 10-20 mm higher than the first detection head, the tap being connected with the flexible pipe through the transition joint; and the water tank being located beyond the tap and the transition joint; wherein the second controller controls the motion and rotation of the tap.

2. The water confinement layer spraying apparatus according to claim 1, wherein the tap contains a outer casing and a flat nozzle, a sectional dimension of the flat nozzle is 1 mm×20 mm, the flat nozzle being rotatable around the axis of the outer casing, wherein there are taper pipe threads at both ends of the transition joint and the tap and the flexible pipe are connected to different respective ends of the transition joint, the second controller being set between the flexible pipe and an outer casing of tap, which is used to control rotation of nozzle and flux, pressure, and velocity of the water jet, the flexible pipe comprising 15-30 small taper pipes; wherein an angle between two adjacent taper pipe axes is below 30°.

* * * * *